Oct. 17, 1967   A. H. FREEMAN ET AL   3,348,116
ELECTRIC KNIFE STORAGE CASE AND BATTERY CHARGER
Filed Oct. 2, 1964                                  2 Sheets-Sheet 1
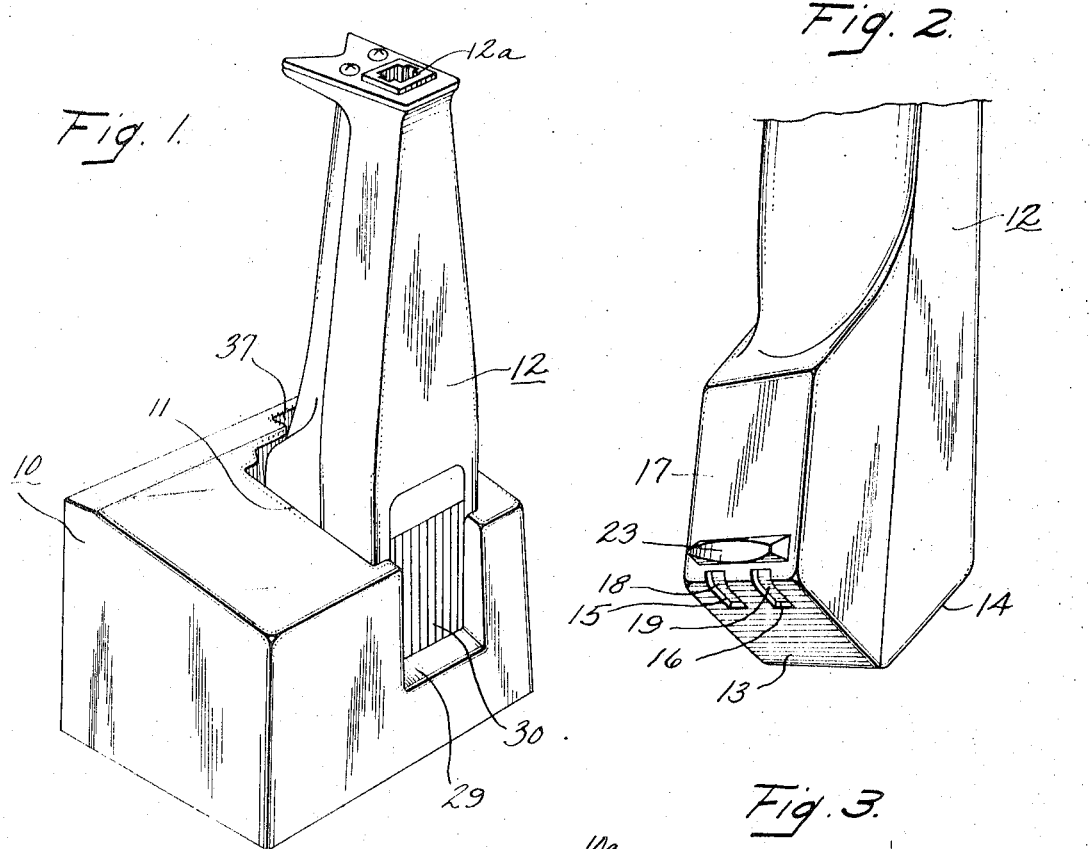
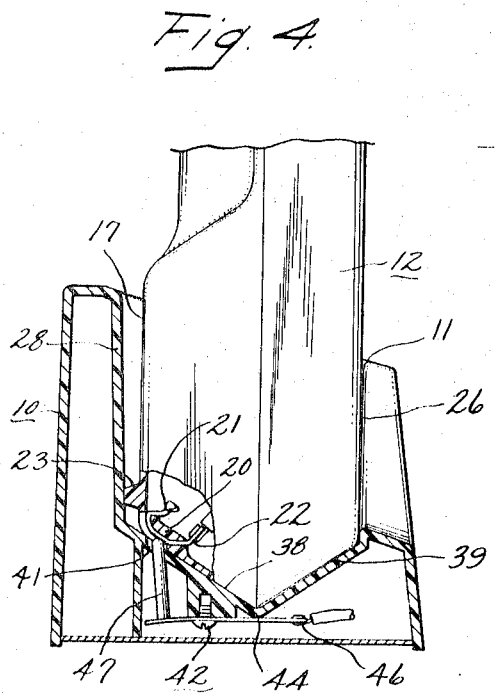
Inventors:
Arthur H. Freeman
Hugh M. Forman.
by Laurence R. Kempton
            Attorney Oct. 17, 1967    A. H. FREEMAN ET AL    3,348,116
ELECTRIC KNIFE STORAGE CASE AND BATTERY CHARGER
Filed Oct. 2, 1964    2 Sheets-Sheet 2

Inventors:
Arthur H. Freeman,
Hugh M. Forman.
by Laurence R. Kempton
Attorney

United States Patent Office 3,348,116
Patented Oct. 17, 1967

3,348,116
ELECTRIC KNIFE STORAGE CASE AND
BATTERY CHARGER
Arthur H. Freeman, Brockport, N.Y., and Hugh M. Forman, Wauwatosa, Wis., assignors to General Electric Company, a corporation of New York
Filed Oct. 2, 1964, Ser. No. 401,155
6 Claims. (Cl. 320—2)

This invention relates to a storage case and the battery charging arrangement for a battery-operated electric knife.

The introduction of the electric slicing knife as a mass produced consumer appliance by the assignee of this application has achieved unusual success and widespread acceptance of this product as a valuable household appliance. One example of an electric knife presently marketed by applicants' assignee is described in co-pending application Ser. No. 298,302, J. W. Beisheim, filed July 29, 1963, now Patent No. 3,203,096. As in the case of other small motorized appliances, a demand for battery-operated knives, comparable to the earlier alternating electric current devices, has arisen. Rechargeable batteries, which may be conveniently contained within the handle are preferable for such appliances as electric knives for convenient and low cost operation.

Of course, as a necessary adjunct to a rechargeable battery-operated knife it is necessary that means be provided to conveniently recharge the batteries in the knife handle. In view of the periods of time that the knife handle must spend in such a charging unit, it is desirable to combine in the charging unit a convenient storage rack for the knife handle when it is not in use. For battery charging such an arrangement must insure satisfactory electrical contact between the charger terminals and the battery terminals of the knife handle. Regarding storage, the unit must provide for easy positioning of the handle in its proper location and adequate support.

Accordingly, it is an object of this invention to provide a storage rack and battery charger for an electric knife handle for supporting the handle for convenient accessibility and battery charging.

It is a further object of this invention to provide such a rack and charger unit for insuring accurate alignment of the knife handle battery contacts and the charging terminals of the recharging unit.

It is another object of this invention to provide such a rack and charging unit for providing reliable, longlife, electrical contact between the knife handle battery contacts and the terminals of the charging unit when the knife handle is positioned in the rack.

In carrying out the object of this invention in one form thereof a housing is provided which contains electrical recharging means for the recharging of batteries of an electric knife handle which may be conveniently inserted in a socket formed in the housing. A pair of electrical terminals, connected to the charging unit within the housing, extend through the housing walls which form the handle socket for electrical contact with a pair of terminals on the knife handle. Preferably, the charging terminals extend through a sloping surface of the housing socket to provide some sliding motion between the terminals and the handle contacts as the handle is inserted in the socket.

As another aspect of this invention, the charging terminals are resiliently supported within the housing to provide a biasing contact between the terminals and the handle contacts as well as to further insure a wiping action between the terminals and the contacts.

As another feature of this invention, alignment means are formed on the knife handle and on one wall of the socket so that the knife handle may only be positioned in the socket in a manner to insure proper charging. This alignment arrangement also accurately aligns the handle contacts and charging terminals.

Further objects and advantages of our invention may best be understood by reference to the following description taken in connection with the accompanying drawings in which:

FIG. 1 is a perspective view showing the rack and charger unit having a knife handle positioned therein for proper charging;

FIG. 2 is a perspective view of the rear portion of the knife handle showing the socket alignment means and the handle charging contacts;

FIG. 3 is a top view of the charger rack shown in FIG. 1;

FIG. 4 is a side view of the charging rack of FIG. 3 taken along line 4—4 and showing the knife handle in its charging position in partial section;

Figure 5:
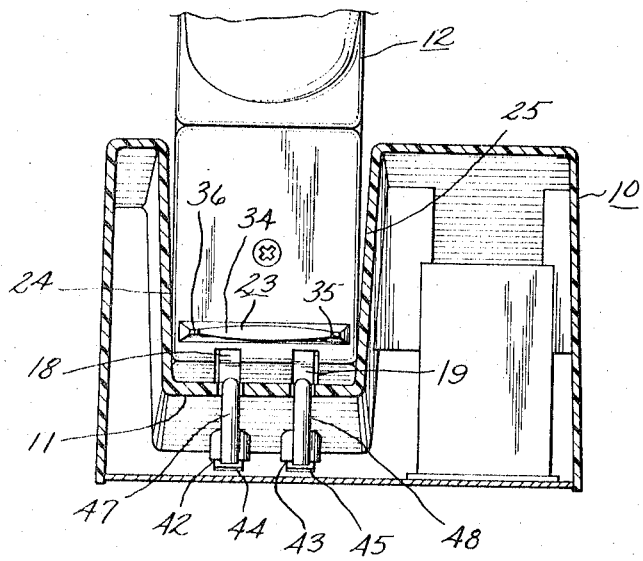
FIG. 5 is a rear sectional view of the charging rack of FIG. 3 taken along line 5—5, with the knife handle being shown in its charging position.

Turning now to the drawing, FIG. 1 shows a battery charger rack casing or housing 10 having a socket shown generally at 11 in which an electric knife handle 12 may be inserted in a vertical position. Casing 10 is preferably molded of a suitable lightweight thermoplastic material. In addition to providing a support arrangement for handle 12 the casing also houses a conventional electrical means (not shown) for charging electric batteries such as nickel cadmium cells which are housed in the knife handle.

The mode of operation and drive mechanism of knife handle 12 is generally similar to the electric knife described in the aforementioned co-pending Beisheim et al. application with the principal exception that rechargeable batteries are housed within the rear portion of the casing to energize the motor within the handle. An alternating current wiring arrangement provides power to the knife motor shown by Beisheim et al. The forward end of handle 12 is provided with an opening 12a which is adapted to receive a pair of electric knife blades.

In accordance with this invention, as may be seen in FIGS. 2-6, socket 11 of casing 10 and the rearward portion of handle 12 are designed for close cooperation to insure satisfactory battery charging and handle support. The rear end of the knife handle includes a pair of generally flat intersecting surfaces 13 and 14 which are inclined at approximately 45° to the longitudinal axis or base line of the knife handle. A pair of recesses 15 and 16 are formed in inclined surface 13 and extend into the rearward portion of the flat lower handle surface 17.

In order to provide external electrical access to the handle batteries for recharging, a pair of battery contacts 18 and 19 are secured to an integral bridge or contact support within the recesses 15 and 16, such as shown at 20 in FIG. 4. One end of the battery contacts is crimped over the bridge element as shown at 21 to firmly hold the contacts to the knife handle, while the other end, such as 22, is bent somewhat over the bridge for connection to suitable wiring of the battery system within the knife handle.

Adjacent recesses 15 and 16 an integral projection 23 is formed on bottom surface 17 for cooperation with casing socket 11 as will be more fully described hereinafter.

Turning to the construction of the charger casing, socket 11 is defined by a pair of side walls 24, and 25, a forward wall 26, a bottom wall 27 and a rear wall 28. Walls 24, 25 and 26 are generally flat and vertical. Side walls 24 and 25 are spaced a distance slightly greater than the width of the knife handle, as best seen in FIG. 5, to substantially prevent any lateral movement of the knife handle in the socket. An opening 29 is formed in the forward wall 26 so as to permit complete visibility of a name plate or other decorative device such as 30 which may be secured to the top surface of the knife handle.

Figure 6:
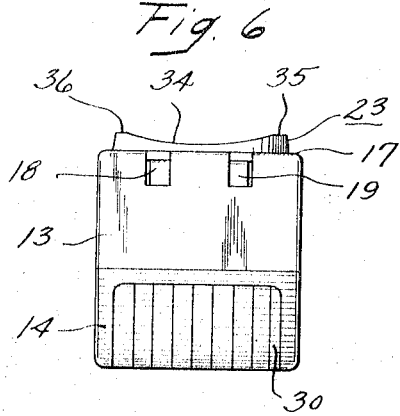
FIG. 6 is a rear view of the knife handle.

To provide accurate positioning of the knife handle in socket 11 for battery charging rear wall 28 is formed so as to be keyed to or mated with handle projection 23. This relationship permits the ready sliding of the handle downwardly into the socket with the bottom surface 17 of the handle facing wall 28. In the preferred form rear wall 28 includes two parallel, generally vertical, grooves 31 and 32 having a convex surface 33 therebetween. FIG. 6 perhaps best shows the configuration of projection 23 as having a concave central portion 34 and projecting outer ends 35 and 36 which are received respectively in grooves 31 and 32 of the socket wall.

A recess 37 is molded into the top of wall 28 to receive a fastening element (not shown) which may extend through an aperture in rear casing wall 10a to mount casing 10 to a vertical surface.

Bottom wall 27 of the casing socket comprises two differently sloping portions 38 and 39 which intersect to generally conform to the rear end of the knife handle. Rearward sloping portion 38 includes a pair of circular apertures 40 and 41.

For electrical connection between the charging means within casing 10 and the handle batteries when the knife handle is positioned in socket 11, a pair of terminal assemblies 42 and 43 are secured within casing 10, generally beneath socket 11. Terminal assemblies 42 and 43 each include a resilient leaf spring such as 44 and 45 which are secured by a screw or other suitable fastener to the casing. One end of each of the springs is adapted for electrical connection to the charging means as at 46. Adjacent the other end of each spring and spaced from the fastener in cantilever fashion are terminals or pins 47 and 48.

In their normal positions terminal assembly pins 47 and 48 extend vertically upwardly through apertures 40 and 41, respectively. The terminal pins are preferably of suitable electrically conductive material and one end of each pin is riveted over through an aperture in the leaf spring. For longer life the upper end of each pin is arcuately formed to provide wiping contact with the handle battery contacts.

It can be seen that through the cooperation of the projection 23 with the rear wall 28 of socket 11 the knife handle is accurately positioned in the casing so that contacts 18 and 19 are in alignment to contact electrically pins 47 and 48. Furthermore, the sloping configuration of rear surface 13 of the knife handle and that of the bottom socket wall portion 38 insure a sliding or wiping contact between the top of the terminal pins and the handle contacts. This contacting action also adds to the life of the elements which otherwise tend to become pitted at a fixed point of contact. While any reasonable slope in the bottom wall of the socket would provide the sliding contact which our invention achieves, it has been found desirable to have the angle of the slope at about 45° to the horizontal. Further wiping relationship between the handle contacts and the terminal pins results from the resilience of the terminal springs which permits a limited deflection of the terminal pins downwardly as seen in FIG. 4 when the knife handle is fully seated in its proper position.

Several additional advantages are provided by the unique terminal assemblies of this invention. Our terminal arrangement applies a spring biased force pressing pins 47 and 48 against their respective handle contacts, thereby minimizing any chance of weak electrical connection. Also, as may be seen in FIG. 4, the forward surface 26 of socket 11 is spaced from the rear wall 28 by a distance somewhat greater than the top to bottom dimension of the knife handle to simplify the insertion of the handle into the socket. Due to the biasing force of the terminal assembly springs 44 and 45 against the handle contacts the knife handle is biased forwardly so that its top surface is pressed against wall 26 in a relatively firm position. This eliminates any unnecessary shaking or instability of the handle when in the casing socket.

It can be seen that the close relationship of the projection 23 to the handle-mounted contacts and the similar adjacency of the rear socket wall to the terminal pins of the charging unit insure accurate guidance of the knife handle so that the handle contacts will be in satisfactory electrical contact with the charging terminal pins. Due to the dimensioning of the socket walls with respect to one another and the keying relationship of the handle to the rear socket wall, it is also impossible for the user to place the handle in the charging socket in any manner in which the electrical elements are not in charging contact with one another. The elongated design of terminal assembly pins 47 and 48 permit mounting of the pins beneath socket 11 and provide excellent contact with the handle contacts which are protected from normal handling within their respective recesses.

Our invention therefore provides a combined storage rack and charging unit in which an electric knife handle may be inserted with accurate alignment and wiping contact of the charging contacts and the external handle contacts. It should be noted that the knife handle is firmly held in a conveniently available position.

While we have shown and described the specific embodiment of our invention, we do not desire our invention to be limited to the particular construction shown and described. Instead, we intend, by the appended claims to cover all modifications within the spirit and scope of our invention.

What we claim is:

1. A storage rack and battery charger for a motorized electric knife handle containing a rechargeable battery comprising:
    (a) a housing;
    (b) electrical means in said housing for charging said battery;
    (c) a pair of contacts having portions disposed on the exterior of and mounted on said handle and connected to said battery;
    (d) a socket formed in said housing substantially conforming to a portion of said handle to fix said handle with respect thereto;
    (e) said socket including a wall portion having a pair of apertures therein;
    (f) a pair of terminal means included within said electrical means, each of said terminal means extending through a respective one of said apertures into said socket and positioned to slidingly engage the surface of a respective one of said contacts so as to insure wiping of said contacts on insertion of said handle into said socket; and
    (g) cooperating alignment means formed on said handle and on said socket for insuring electrical contact between said contacts and said terminal means when said handle is positioned in said socket.

2. A storage rack and battery charger as in claim 1 wherein:
    (a) resilient means are included for biasing each of said terminal means.

3. A storage rack and battery charger as in claim 2 wherein: said socket includes a plurality of generally vertical side walls to support said knife handle in a substantially vertical position and a pair of intersecting and differently sloping walls which include said wall portion having said apertures therein.

4. A storage rack and battery charger as in claim 3 wherein:
    (a) said cooperating alignment means includes a projection formed on said handle and a cooperating groove formed in one of said side walls; and (b) the other of said side walls have substantially uniform surfaces so that said handle may only be inserted in the proper orientation into said socket.

5. A storage rack and battery charger as in claim 4 wherein:
   (a) said cooperating alignment means further includes an end portion of said handle having sides which mate with said pair of intersecting and differently sloping walls of said socket;
   (b) said contacts are positioned in a recess in the end portion of said handle substantially in vertical alignment with said apertures in said wall portion; and
   (c) each of said terminal means is an elongated member having a blunt portion to slidingly engage the respective contact.

6. A storage rack and battery charger as in claim 5 wherein said resilient means acting through said terminal means and said contacts biases said handle against one of said vertical side walls.

References Cited

UNITED STATES PATENTS

| | | | |
|---|---|---|---|
| 2,732,159 | 1/1956 | Conners et al. | 248—224 |
| 2,982,849 | 5/1961 | Volkerling et al. | 320—2 X |
| 3,143,697 | 8/1964 | Springer | 320—2 |
| 3,183,891 | 5/1965 | MacDonald | 120—36 |
| 3,194,621 | 7/1965 | Frost | 312—209 X |
| 3,217,224 | 11/1965 | Sherwood | 320—2 |
| 3,257,599 | 6/1966 | Sommers et al. | 320—2 |

JOHN F. COUCH, Primary Examiner.

S. WEINBERG, Assistant Examiner.